(12) United States Patent  (10) Patent No.: US 8,928,634 B2
Hsu  (45) Date of Patent: Jan. 6, 2015

(54) ACTIVE ELECTROMAGNETIC PEN

(75) Inventor: Suei-Shih Hsu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 95 days.

(21) Appl. No.: 13/038,749

(22) Filed: Mar. 2, 2011

(65) Prior Publication Data

US 2012/0182270 A1  Jul. 19, 2012

(30) Foreign Application Priority Data

Jan. 14, 2011 (TW) .............................. 100101529 A

(51) Int. Cl.
*G06F 3/033* (2013.01)
*G06F 3/0354* (2013.01)

(52) U.S. Cl.
CPC .................................. *G06F 3/03545* (2013.01)
USPC ........................................................ 345/179

(58) Field of Classification Search
USPC ........................................................ 345/179
See application file for complete search history.

(56) References Cited

U.S. PATENT DOCUMENTS 4,751,741 A * 6/1988 Mochinaga et al. ........... 382/188
5,895,895 A * 4/1999 Ono et al. ..................... 178/19.03

FOREIGN PATENT DOCUMENTS

| CN | 101169691 A | 4/2008 |
| CN | 201348773 Y | 11/2009 |
| CN | 101901063 A | 12/2010 |
| TW | 200821940 A | 5/2008 |
| TW | M368134 | 11/2009 |

OTHER PUBLICATIONS

Chinese Patent Office, "Office Action", Feb. 8, 2014.
Taiwan Patent Office, "Office Action", Aug. 14, 2013.

* cited by examiner

*Primary Examiner* — Jonathan Boyd
(74) *Attorney, Agent, or Firm* — WPAT, PC; Justin King

(57) ABSTRACT

An active electromagnetic pen includes a pen body, a pen tip, a pressure detecting module and a power supply module. The pen body has an opening on one end thereof. The pen tip is disposed at the opening of the pen body. The pen tip has a tip end and a plane end opposite to the tip end. The tip end is disposed in the pen body, and the plane end is extended to outside of the pen body through the opening. The pressure detecting module is disposed in the pen body and includes a plurality of pressure detecting elements. The pressure detecting elements are respectively connected to different locations of the plane end of the pen tip. The power supply module is disposed in the pen body and is electrically connected to the pressure detecting module.

3 Claims, 3 Drawing Sheets

ACTIVE ELECTROMAGNETIC PEN

FIELD OF THE INVENTION

The present invention relates to an electromagnetic pen, and more particularly to an active electromagnetic pen.

BACKGROUND OF THE INVENTION

Electromagnetic touch panel is an input device using electromagnetic technology. The electromagnetic touch panel is used with a special electromagnetic pen. When the electromagnetic pen is written on a touch surface of the electromagnetic touch panel, the electromagnetic pen can emit electromagnetic signals with special frequencies, and the electromagnetic touch panel can calculate a coordinate of the electromagnetic pen according to the electromagnetic signals. Moreover, the electromagnetic pens can be classified as active electromagnetic pens and passive electromagnetic pens. The active electromagnetic pen needs a battery to supply power, and the passive electromagnetic pen does not need the battery to supply power. Compared with the electromagnetic touch panel using the passive electromagnetic pen, the electromagnetic touch panel using the active electromagnetic pen does not need to emit energy for the electromagnetic pen. Therefore, the electromagnetic touch panel using the active electromagnetic pen has advantages of power saving and high report rate of coordinate information.

FIG. 1 is a schematic view of a conventional active electromagnetic pen. Referring to FIG. 1, a conventional active electromagnetic pen 100 includes a pen body 110, a pen tip 120, a pressure detecting module 130 and a power supply module 140. The pen body 110 has an opening 112 on one end thereof, and the pen tip 120 is disposed at the opening 112 of the pen body 110. The pen tip 120 has a tip end 122 and a plane end 124 opposite to the tip end 122. The plane end 124 is disposed in the pen body 110, and the tip end 122 is extended to outside of the pen body 110 through the opening 112. The pressure detecting module 130 is disposed in the pen body 110, and the pressure detecting module 130 has a pressure detecting element 132. The pressure detecting element 132 is connected to the plane end 124 of the pen tip 120 via a connecting element 134. The power supply module 140 is disposed in the pen body 110 and is configured to supply power to the pressure detecting module 130.

When the pen tip 120 is pressed by external force, the pressure detecting element 132 can detect the pressure, and the pressure detecting module 130 can send the detected pressure values via emitting electromagnetic signals with special frequencies, and the electromagnetic touch panel can calculate the coordinate of the active electromagnetic pen 100 according to the received electromagnetic signals.

However, in the conventional technology, since the pressure detecting module 130 includes only one pressure detecting element 132, detecting sensitivity is low. Furthermore, the direction of pressure applying on the pen tip 120 can not be detected.

SUMMARY OF THE INVENTION

The present invention provides an active electromagnetic pen which can detect direction of pressure applying on the active electromagnetic pen.

To achieve the above-mentioned advantage, the present invention provides an active electromagnetic pen including a pen body, a pen tip, a pressure detecting module and a power supply module. The pen body has an opening on one end thereof. The pen tip is disposed at the opening of the pen body. The pen tip has a tip end and a plane end opposite to the tip end. The plane end is disposed in the pen body, and the tip end is extended to outside of the pen body through the opening. The pressure detecting module is disposed in the pen body and includes a plurality of pressure detecting elements. The pressure detecting elements are respectively connected to different locations of the plane end of the pen tip. The power supply module is disposed in the pen body and is electrically connected to the pressure detecting module.

In one embodiment of the present invention, the pressure detecting module further includes a plurality of connecting rods, and each pressure detecting element is connected to the plane end of the pen tip via one of the connecting rods.

In one embodiment of the present invention, the locations of the plane end where the connecting rods are connected to are distributed on the plane end along a circular path.

In one embodiment of the present invention, the pressure detecting elements are directly connected to the plane end, and the locations of the plane end where the pressure detecting elements are connected to are distributed on the plane end along a circular path.

The active electromagnetic pen of the present invention adopts the plurality of pressure detecting elements connected to the different locations of the plane end of the pen tip. Therefore, the active electromagnetic pen can detect the direction of pressure applying on the pen tip.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
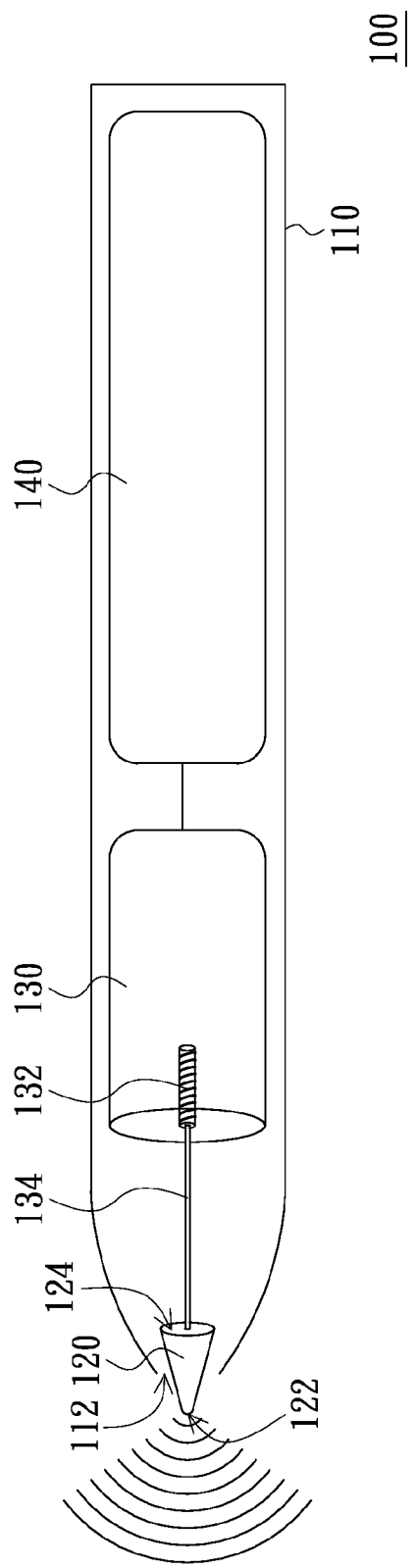
FIG. 1 is a schematic view of a conventional active electromagnetic pen.
Figure 2:
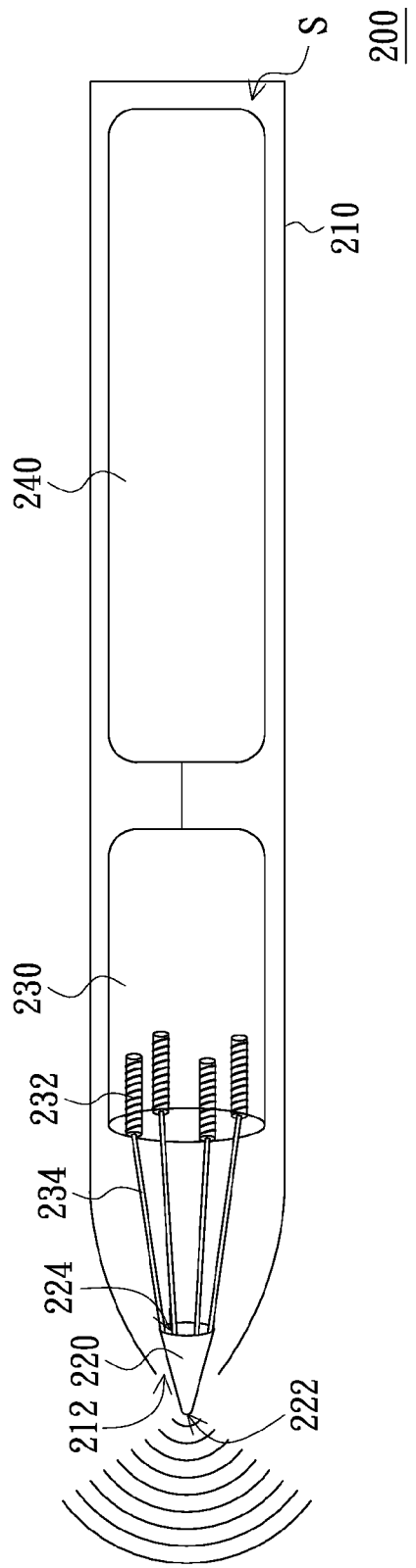
FIG. 2 is a schematic view of an active electromagnetic pen according to an embodiment of the present invention.
Figure 3:
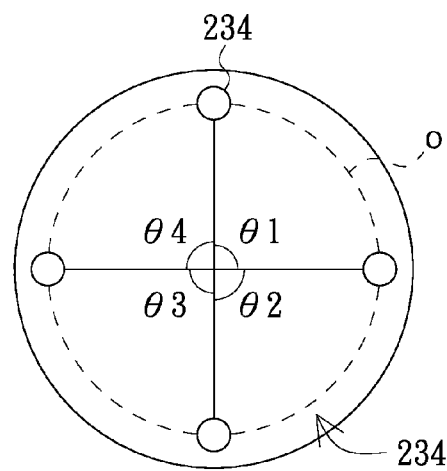
FIG. 3 is a schematic view showing a plurality of connecting rods connecting to different locations of a plane end of a pen tip according to an embodiment of the present invention.

FIG. 2 is a schematic view of an active electromagnetic pen according to an embodiment of the present invention. FIG. 3 is a schematic view showing a plurality of connecting rods connecting to different locations of a plane end of a pen tip according to an embodiment of the present invention. Referring to FIG. 2, an active electromagnetic pen 200 of the present embodiment includes a pen body 210, a pen tip 220, a pressure detecting module 230 and a power supply module 240, wherein the pen tip 220, the pressure detecting module 230 and the power supply module 240 are disposed in an accommodation space S of the pen body 210. The pen body 210 has an opening 212 on one end thereof, and the pen tip 220 is disposed at the opening 212 of the pen body 210. The pen tip 220 has a tip end 222 and a plane end 224 opposite to the tip end 222. The plane end 224 is disposed in the pen body 210, and the tip end 222 is extended to outside of the pen body 210 through the opening 212. The pressure detecting module 230 includes a plurality of pressure detecting elements 232. The pressure detecting elements 232 are respectively connected to different locations of the plane end 224 of the pen tip 220. The power supply module 240 is electrically connected to the pressure detecting module 230, so as to supply power to the pressure detecting module 230.

In the present embodiment, the power supply module 240 may include a battery and relevant circuits, so as to supply the power of the battery to the pressure detecting module 230. The pressure detecting elements 232 of the pressure detecting module 230 are configured to detect pressed situations of the pen tip 220. The pressure detecting module 230 further includes other circuit unit (not shown) which are configured to send the detected pressure values to a electromagnetic touch panel used with the active electromagnetic pen 200 via emitting electromagnetic signals with special frequencies. The electromagnetic touch panel can calculate coordinate of the active electromagnetic pen 200 according to the received electromagnetic signals.

The pressure detecting module 230 of the present embodiment, for example, further includes a plurality of connecting rods 234. Each pressure detecting element 232 is connected to the plane end 224 of the pen tip 220 via a corresponding connecting rod 234. Material of the connecting rods 234 can be plastic, metal or other material without magnetism. In the present embodiment, a number of the connecting rods 234 and a number of the pressure detecting elements 232 respectively are, for example, four. Furthermore, as shown in FIG. 3, in the present embodiment, the locations of the plane end 224 where the connecting rods 234 are connected to are, for example, distributed on the plane end 224 along a circular path O. Central angles between two locations of the plane end 224 where the two adjacent connecting rods 234 are connected to are, for example, equal. In other words, central angles θ1, θ2, θ3 and θ4 are equal to each other, and central angles θ1, θ2, θ3 and θ4 are, for example, 90 degrees.

It should be noted that, the number of the pressure detecting elements 232 and the connecting rods 234 is taken as an example in the present embodiment, but the present invention is not limited to the embodiment. Actually, the present invention only limits that the number of the pressure detecting elements 232 is at least two, and the number of the pressure detecting elements 232 and the connecting rods 234 can be appropriately adjusted according to design requirements.

Figure 4:
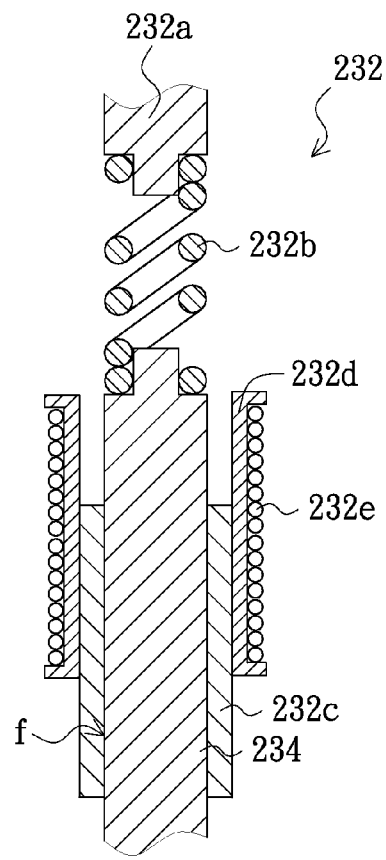
FIG. 4 is a schematic, cross-sectional view of a pressure detecting element according to an embodiment of the present invention.

FIG. 4 is a schematic, cross-sectional view of a pressure detecting element according to an embodiment of the present invention. Referring to FIG. 4, each pressure detecting element 232 of the present embodiment, for example, includes a connecting end 232a, an elastic element 232b, a movable magnetic core 232c, a lead sleeve 232d and a coil 232e. Two ends of the elastic element 232b are respectively fixed to the connecting end 232a and a corresponding connecting rod 234. The elastic element 232b is, for example, a spring. The movable magnetic core 232c has a through hole 232f therein. The connecting rod 234 is passed through the through hole 232f and is fixed to the movable magnetic core 232c. The movable magnetic core 232c is movably disposed in the lead sleeve 232d. The coil 232e surrounds an outer surface of the lead sleeve 232d and is connected to other electronic components of the pressure detecting module 230, such as a capacitor (not shown), so as to form an oscillation sensing circuit.

Referring to FIG. 2 and FIG. 4, when the tip end 222 of the pen tip 220 is contacted with a touch surface of the electromagnetic touch panel, the pen tip 220 is retracted in the pen body 210 under pressure so that the connecting rods 234 and the movable magnetic cores 232c are moved with the pen tip 220. The magnetic field inside the coils 232e will be changed, the circuit unit of the pressure detecting module 230 can detect the changes of the magnetic field and calculate retracting distance of the movable magnetic cores 232c and the connecting rods 234, and then, the value of pressure applying on each connecting rod 234 can be further calculated according to coefficient of elasticity of elastic elements 232b. Thus, the direction of pressure applying on the pen tip 220 can be obtained according to pressure values of different connecting rods 234.

It should be noted that, the structure description of the pressure detecting elements 232 is only an example, but the present invention is not limited to the embodiment. In other embodiments, the pressure detecting elements can be piezoelectric pressure sensors or other suitable pressure sensors.

The active electromagnetic pen 200 of the present embodiment adopts the plurality of pressure detecting elements 232 connected to the different locations of the plane end 224 of the pen tip 220. When the active electromagnetic pen 200 is contacted with the touch surface of the electromagnetic touch panel, even if the active electromagnetic pen 200 is not perpendicular to the touch surface of the electromagnetic touch panel, the active electromagnetic pen 200 can also detect pressure. Moreover, the active electromagnetic pen 200 of the present embodiment can judge the direction of pressure applying on the pen tip 220 according to the compression levels of the different pressure detecting elements 232. Therefore, the active electromagnetic pen 200 of the present embodiment has an advantage of good detection sensitivity, and it is convenient for a user to write on the touch surface of the electromagnetic touch panel using the active electromagnetic pen 200.

It is worth noting that, in the above-mentioned embodiment, although the pressure detecting elements 232 are connected to the plane end 224 of the pen tip 220 via the connecting rods 234, in another embodiment, the pressure detecting elements can be directly connected to the plane end 224. For example, the pressure detecting elements can be directly contacted with the plane end 224 via movable magnetic cores. Additionally, similar to FIG. 3, the locations of the plane end where the pressure detecting elements are connected to are, for example, distributed on the plane end along a circular path.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An active electromagnetic pen comprising:
   a pen body having an opening on one end thereof;
   a pen tip disposed at the opening of the pen body, the pen tip having a tip end and a plane end opposite to the tip end, the plane end being disposed in the pen body, and the tip end being extended to outside of the pen body through the opening;
   a pressure detecting module disposed in the pen body, the pressure detecting module comprising a plurality of pressure detecting elements and a plurality of connecting rods, the pressure detecting elements being respectively connected to different locations of the plane end of the pen tip via the connecting rods, all of the pressure detecting elements being located in a same end of the pressure detecting module, each pressure detecting element comprising:

a connecting end;

an elastic element connected between the connecting end and one corresponding connecting rod of the connecting rods;

a movable magnetic core comprising a through hole, the connecting rod passing through the through hole and being fixed to the movable magnetic core;

a lead sleeve, wherein the movable magnetic core is movably disposed in the lead sleeve; and a coil surrounding an outer surface of the lead sleeve; and a power supply module disposed in the pen body and electrically connected to the pressure detecting module.

2. The active electromagnetic pen according to claim 1, wherein the locations of the plane end where the connecting rods are connected to are distributed on the plane end along a circular path.

3. The active electromagnetic pen according to claim 2, wherein central angles between two locations of the plane end where each two adjacent connecting rods are connected to are equal.

* * * * *